United States Patent
Uno et al.

(10) Patent No.: US 10,811,861 B2
(45) Date of Patent: Oct. 20, 2020

(54) CABLE GUIDE DEVICE AND WIRE HARNESS

(71) Applicants: SUMITOMO WIRING SYSTEMS, LTD., Yokkaichi-shi, Mie (JP); HONDA MOTOR CO., LTD., Tokyo (JP)

(72) Inventors: Hiroki Uno, Yokkaichi (JP); Yuuji Kida, Yokkaichi (JP); Joji Goto, Wako (JP); Hiroshi Shingu, Wako (JP)

(73) Assignees: SUMITOMO WIRING SYSTEMS, LTD., Mie (JP); HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/312,840

(22) PCT Filed: Jun. 23, 2017

(86) PCT No.: PCT/JP2017/023175
§ 371 (c)(1),
(2) Date: Dec. 21, 2018

(87) PCT Pub. No.: WO2017/222044
PCT Pub. Date: Dec. 28, 2017

(65) Prior Publication Data
US 2019/0214806 A1 Jul. 11, 2019

(30) Foreign Application Priority Data
Jun. 24, 2016 (JP) .................................. 2016-125548

(51) Int. Cl.
*H02G 11/00* (2006.01)
*B60R 16/02* (2006.01)
(Continued)

(52) U.S. Cl.
CPC ......... *H02G 11/006* (2013.01); *B60R 16/027* (2013.01); *B60R 16/0207* (2013.01);
(Continued)

(58) Field of Classification Search
CPC ...... H01B 17/58; H01B 17/583; H01B 17/60; H02G 3/04; H02G 3/0406; H02G 11/00;
(Continued)

(56) References Cited

U.S. PATENT DOCUMENTS 2,855,232 A * 10/1958 Kozak .................. F16C 11/083
403/132
3,843,272 A * 10/1974 Jorn ....................... B60G 7/005
403/132
(Continued)

FOREIGN PATENT DOCUMENTS

JP 2007-20385 A 1/2007
JP 2007-118849 A 5/2007
(Continued)

OTHER PUBLICATIONS

Aug. 1, 2017, International Search Report issued in International Patent Application No. PCT/JP2017/023175.

*Primary Examiner* — Paresh H Paghadal
(74) *Attorney, Agent, or Firm* — Oliff PLC

(57) ABSTRACT

A cable guide device and a wire harness that can allow the mounting position of the wire harness to be lowered. A bracket to be fixed to a fixed portion; a guide end disposed at an end portion of a cable guide that can be bent into a predetermined shape, and held by the bracket; a rotary portion provided on an upper surface side of the guide end in a state of being held by the bracket fixed to the fixed portion, and having an outer surface formed with a curved surface; and an upper flange protruding from the outer surface of the rotary portion substantially in a horizontal (Continued)

direction in the state of being held by the bracket, and configured to enter a groove formed in the bracket.

4 Claims, 9 Drawing Sheets

(51) Int. Cl.
*B60R 16/027* (2006.01)
*H01B 7/00* (2006.01)
*H02G 3/06* (2006.01)
*H02G 3/04* (2006.01)
*H01B 17/58* (2006.01)

(52) U.S. Cl.
CPC ....... *B60R 16/0222* (2013.01); *H01B 7/0045* (2013.01); *B60R 16/0215* (2013.01); *H01B 17/583* (2013.01); *H02G 3/0475* (2013.01); *H02G 3/0608* (2013.01)

(58) Field of Classification Search
CPC .............. H02G 11/006; B60R 16/0215; B60R 16/0222; B60R 16/023; B60R 16/027; F16G 13/14
See application file for complete search history.

(56) References Cited

U.S. PATENT DOCUMENTS

| | | | | |
|---|---|---|---|---|
| 4,070,123 | A | * | 1/1978 | Willingshofer ........ B60G 7/005 280/124.155 |
| 9,494,186 | B2 | * | 11/2016 | Wilson ................ F16C 11/0685 |
| 2003/0222183 | A1 | * | 12/2003 | Kato ................... B60R 16/0215 248/49 |
| 2006/0278424 | A1 | * | 12/2006 | Tsukamoto ......... B60R 16/0215 174/72 A |
| 2007/0209284 | A1 | | 9/2007 | Ochi |
| 2009/0140107 | A1 | * | 6/2009 | Murayama ......... B60R 16/0215 248/60 |
| 2010/0026043 | A1 | * | 2/2010 | Shima ................ B60R 16/0207 296/146.9 |

FOREIGN PATENT DOCUMENTS

| | | |
|---|---|---|
| JP | 2007-274882 A | 10/2007 |
| JP | 2014-42367 A | 3/2014 |

* cited by examiner

CABLE GUIDE DEVICE AND WIRE HARNESS

TECHNICAL FIELD

The present invention relates to a cable guide device and a wire harness.

BACKGROUND ART

There have been known wire harnesses on which a predetermined bending operation is repeatedly performed, such as wire harnesses for supplying power to electrical components mounted in sliding doors of automobiles. For example, a wire harness described in Patent Literature 1 below has a cable guide that encloses wires and guides a predetermined bending operation. The ends (guide ends) of the cable guide are rotatably held on a door-side bracket fixed to a sliding door and a body-side bracket fixed to a body. The guide end has an upper surface provided with a disk-shaped bulging portion and a lower surface in which an insertion cylindrical portion is protrudingly provided. The bulging portion is shallowly fitted into a support cylinder provided in an upper portion of the bracket, and the insertion cylindrical portion is inserted into an insertion hole provided in a lower portion of the bracket.

CITATIONS LIST

Patent Literature

Patent Literature 1: JP 2014-42367 A.

SUMMARY OF INVENTION

Technical Problems

However, in the above configuration, the lower portion of the bracket needs to be provided with a portion for supporting the lower surface side of the guide end. Therefore, it has been difficult to adapt to a case where the mounting position of the wire harness is desired to be lowered.

The present invention has been accomplished in view of the above circumstances. It is an object of the present invention to provide a cable guide device and a wire harness that can allow the mounting position of the wire harness to be lowered.

Solutions to Problems

A cable guide device of the present invention includes: a bracket to be fixed to a fixed portion; a guide end disposed at an end portion of a cable guide that can be bent into a predetermined shape, and held by the bracket; a rotary portion provided on an upper surface side of the guide end in a state of being held by the bracket fixed to the fixed portion, and having an outer surface formed with a curved surface; and an upper flange protruding from the outer surface of the rotary portion substantially in a horizontal direction in the state of being held by the bracket, and configured to enter a groove formed in the bracket.

A wire harness of the present invention includes the cable guide device and a plurality of wires inserted through the cable guide.

Advantageous Effects of Invention

According to the present invention, since the guide end is suspended from and held by the bracket in a rotatable state, it is not necessary to provide in the bracket a portion for supporting the lower surface side of the guide end, with the result that the mounting position of the wire harness can be lowered.

DESCRIPTION OF EMBODIMENTS

A preferred embodiment of the present invention will be described below.

In the cable guide device of the present invention, the rotary portion may have spherical surfaces on both upper and lower sides of the upper flange in the state of being held by the bracket, and the bracket may have a curved surface in conformance with the spherical surfaces. According to this configuration, the guide end can assume a tilting posture while the spherical surfaces are slid on the curved surface, with the result that a clearance between the rotary portion and the bracket (backlash of the guide end) can be reduced.

In the cable guide device of the present invention, the guide end may include a lower flange that can abut against a lower surface of the bracket in the state of being held by the bracket. According to this configuration, the bracket is sandwiched between the upper flange and the lower flange, with the result that the guide end can be prevented from being inclined excessively and hindered in its rotational movement.

Embodiment

Hereinafter, an embodiment of the present invention will be described in detail with reference to FIGS. 1 to 9.

Figure 3:
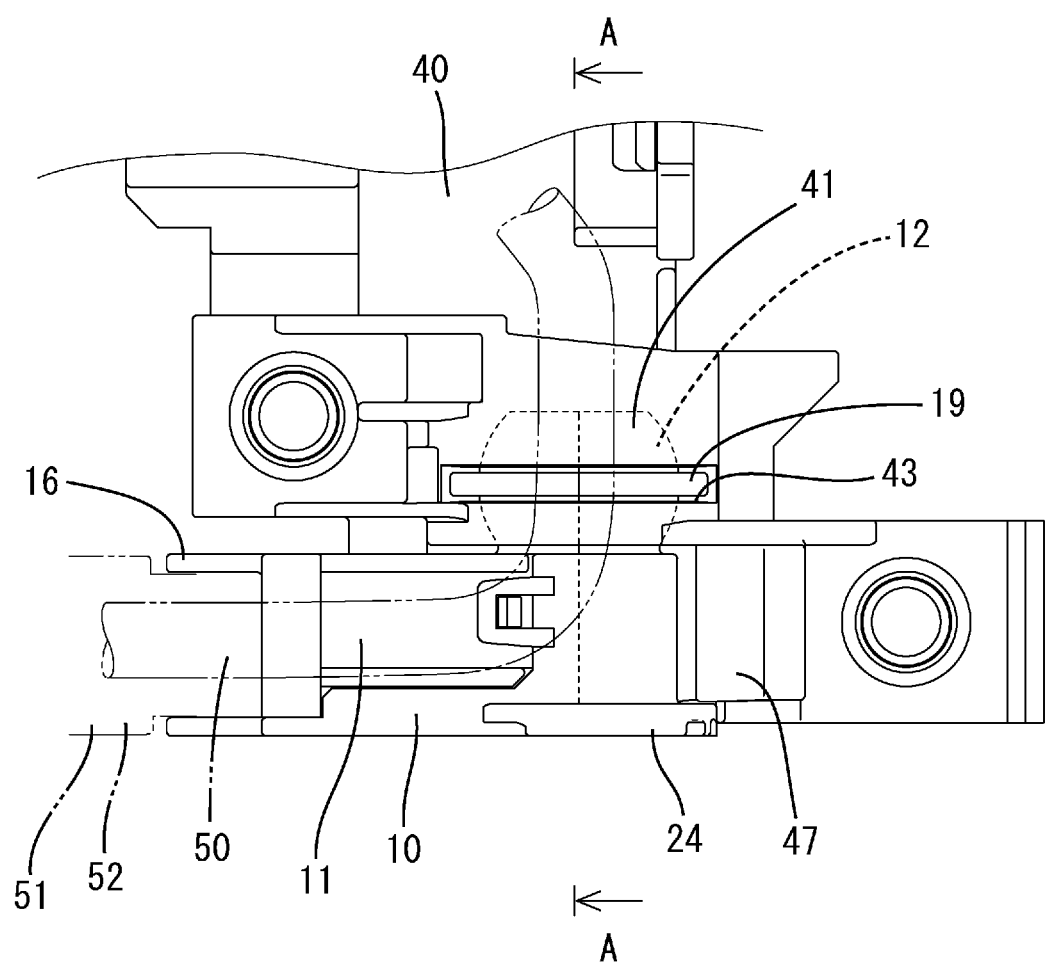
FIG. 3 is a side view showing the guide end of the cable guide attached to the bracket.

A wire harness W in the present embodiment is mounted on a vehicle having a sliding door D. The wire harness W is a sliding door wire harness for constantly supplying power to electric components mounted in the sliding door D. The wire harness W is installed between a vehicle body B and the lower end of the sliding door D. The wire harness W includes a plurality of wires 50 and a cable guide 51 that can be bent into a predetermined shape in a substantially horizontal plane. In the following description, the upper side in FIG. 3 (the upper side in a state where the wire harness W is mounted on the vehicle) is defined as an upside and the lower side in FIG. 3 is defined as a downside in each component.

Figure 1:
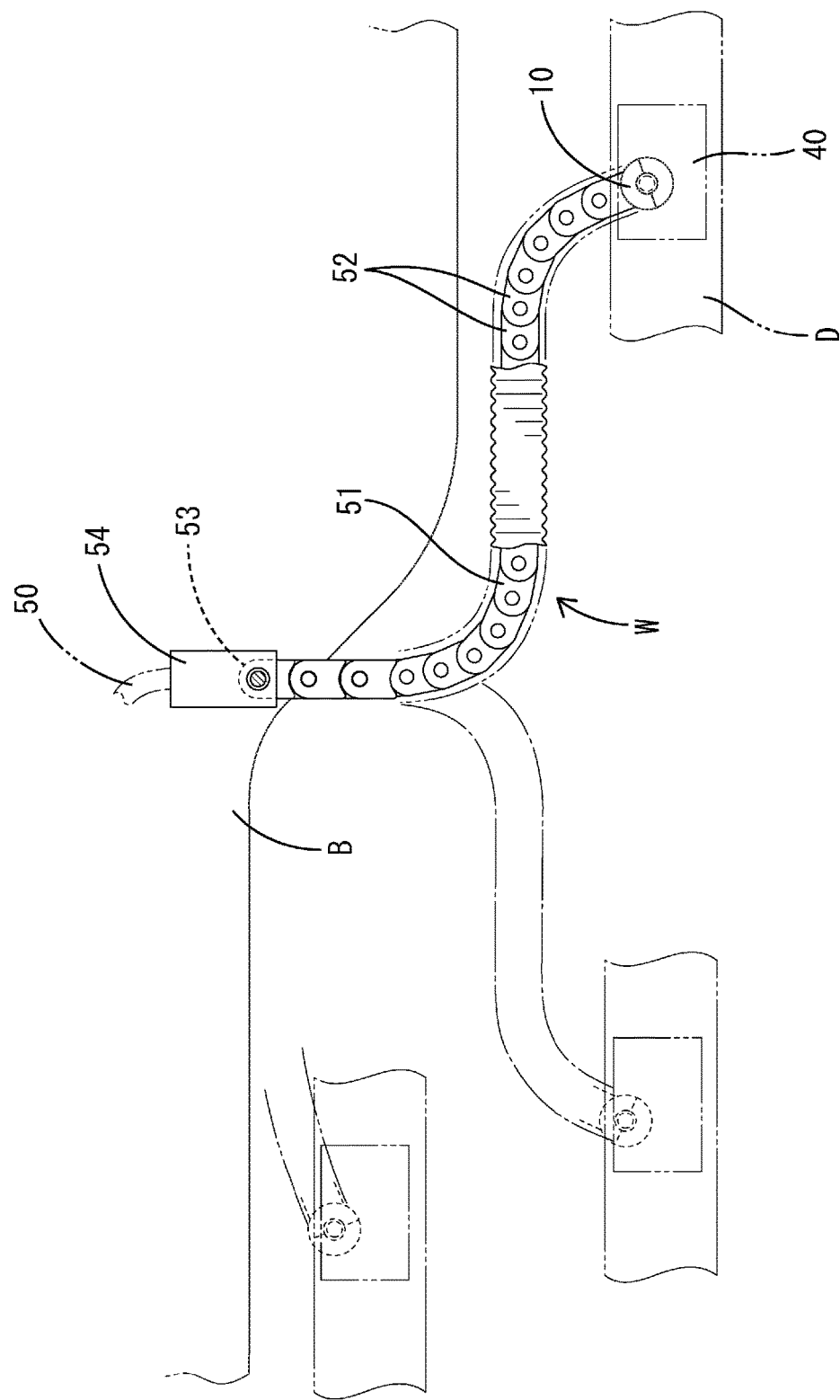
FIG. 1 is a schematic view showing a wire harness in the present embodiment mounted on a vehicle.

As shown in FIG. 1, the cable guide 51 is constituted of a plurality of links 52 rotatably connected together, and a bundle of the wires 50 is inserted therethrough. A guide end 53 arranged at a body B-side end portion of the cable guide 51 is rotatably attached to a body-side bracket 54, and a guide end 10 arranged at a sliding door D-side end portion is rotatably attached to a door-side bracket (hereinafter simply referred to as a bracket 40).

The bracket 40 is fixed to the lower end (fixed portion) of the sliding door D, and has a structure capable of supporting the guide end 10 in a hanging state.

Figure 2:
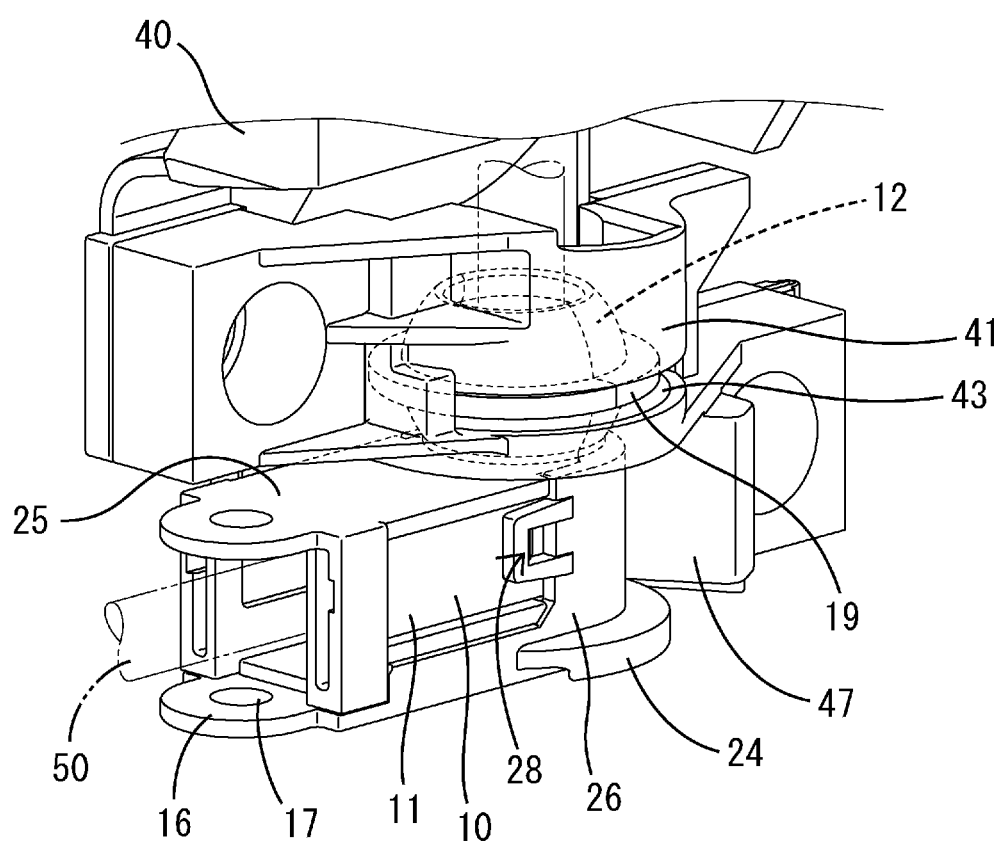
FIG. 2 is a perspective view showing a guide end of a cable guide attached to a bracket.
Figure 4:
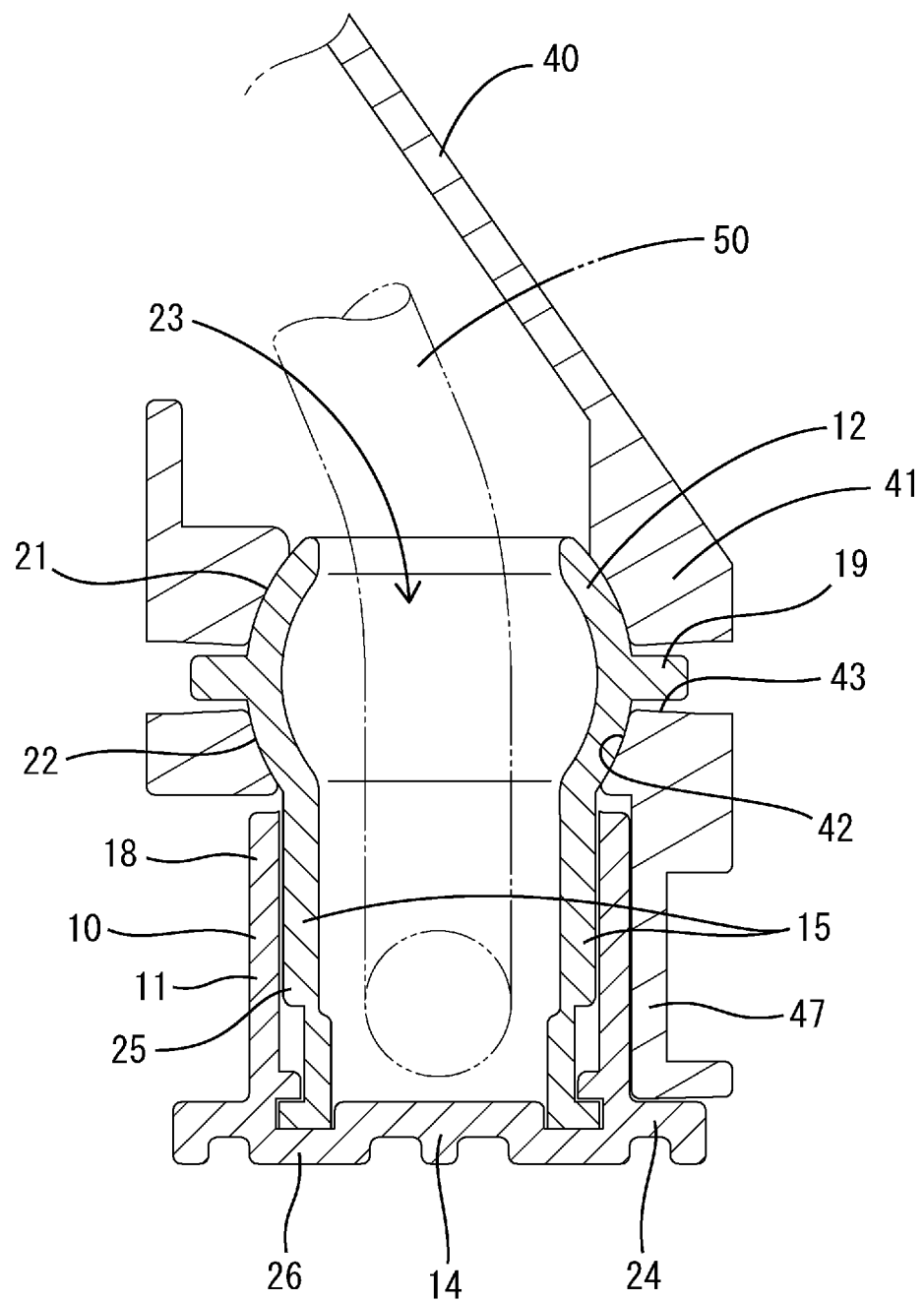
FIG. 4 is a cross-sectional view showing the guide end of the cable guide attached to the bracket, corresponding to a cross section taken at position A-A in FIG. 3.

As shown in FIG. 2, the bracket 40 includes a holding portion 41 for holding a rotary portion 12 of the guide end 10. The holding portion 41 has a cylindrical shape surrounding the entire circumference of the rotary portion 12. As shown in FIG. 4, the inner peripheral surface of the holding portion 41 is formed with a curved surface 42 curved in conformance with the outer surface of the rotary portion 12. The curved surface 42 is a spherical surface continuous over the entire circumference and the overall height of the holding portion 41.

The holding portion 41 is formed with a groove 43 which an upper flange 19 described later can enter, As shown in FIG. 3, the groove 43 extends substantially horizontally and elongatedly in a state where the bracket 40 is fixed to the sliding door D, and penetrates through the holding portion 41 in inside and outside directions of the holding portion 41 (in a horizontal direction), The groove 43 is formed in a vertically central portion of the curved surface 42, and is continuous over the entire circumference of the holding portion 41. The vertical dimension of the groove 43 is set so as to have a minimum clearance to allow a tilting movement of the guide end 10, as compared with the thickness of the upper flange 19.

Figure 5:
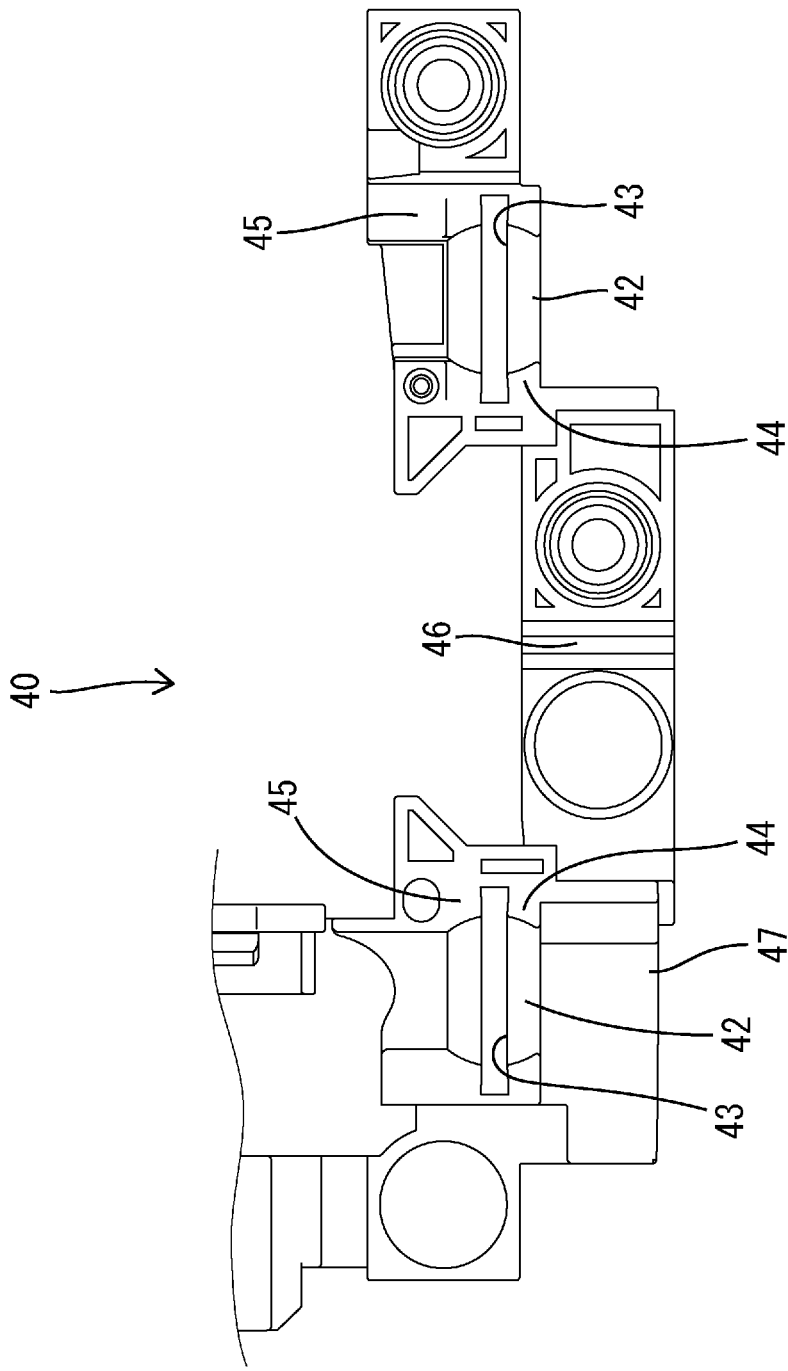
FIG. 5 is a side view showing the bracket with a holding portion being open.
Figure 6:
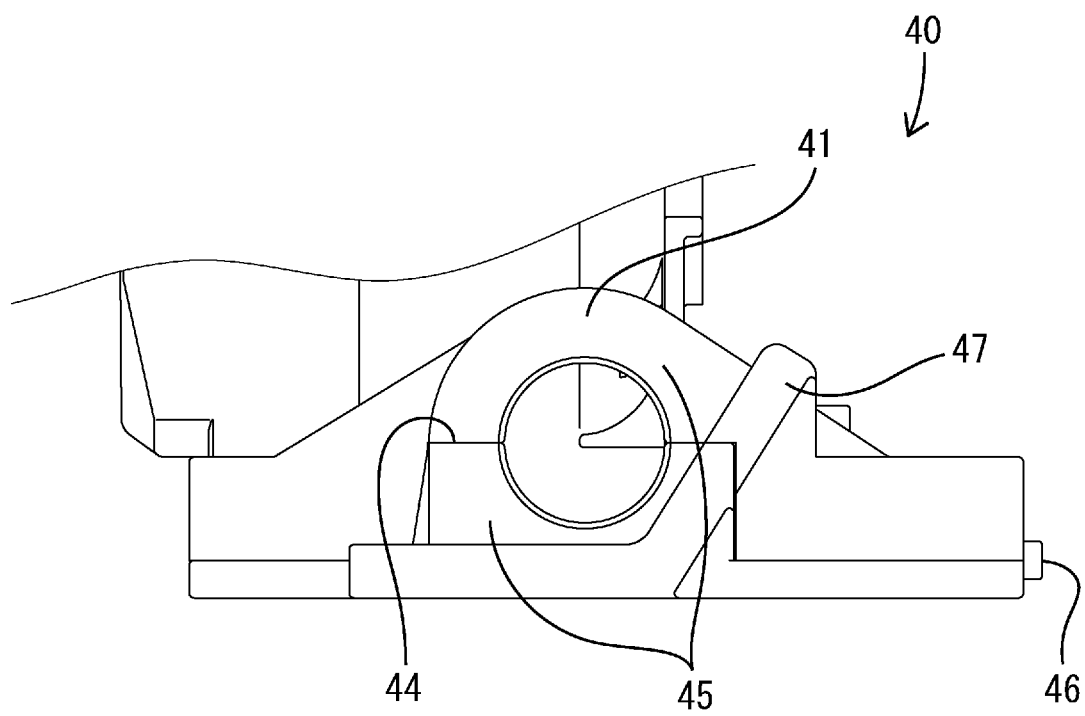
FIG. 6 is a bottom view showing the bracket.

The holding portion 41 has a halved structure divided vertically in the state where the bracket 40 is fixed to the sliding door D (see FIG. 5). The holding portion 41. has a pair of half bodies 45 divided into two by vertical division surfaces 44. The curved surface 42 and the groove 43 are formed in each of the half bodies 45. When the half bodies 45 are brought together (the division surfaces 44 are brought into tight contact), the curved surface 42 and the groove 43 become continuous over the entire circumference. Portions having the half bodies 45 are connected to each other by a hinge 46.

As shown in FIG. 4, the bracket 40 has a hanging portion 47 hanging downward from the holding portion 41. The hanging portion 47 hangs down substantially vertically so as to face a side surface of the guide end 10. The hanging portion 47 has a shape open at an obtuse angle in a plan view to allow the rotation of the guide end 10 (see FIG. 6). With the rotation of the guide end 10, side walls 15 and an end wall 18 of the guide end 10 come close to or separates from the hanging portion 47.

Figure 7:
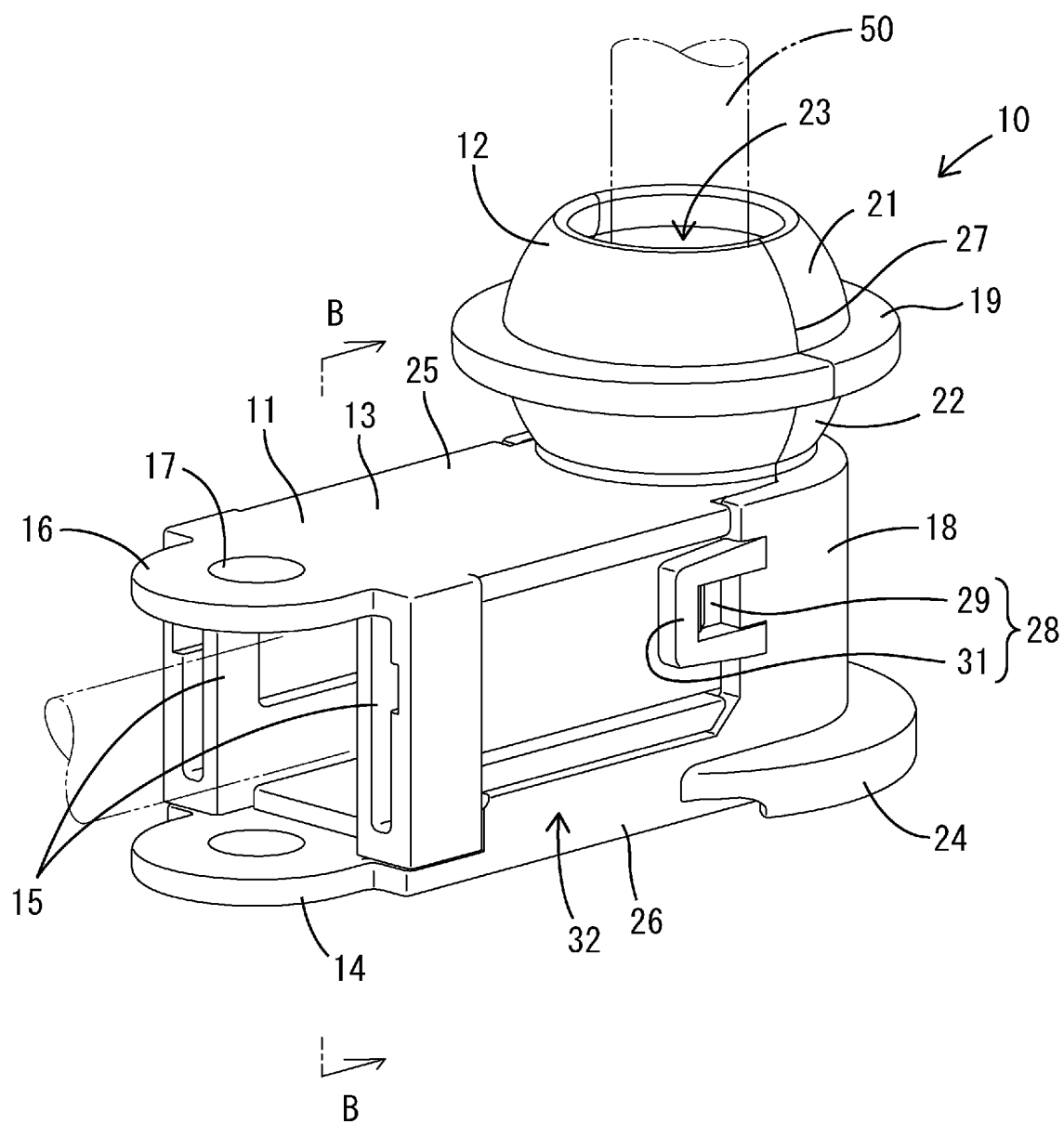
FIG. 7 is a perspective view showing the guide end of the cable guide.

As shown in FIG. 7, the guide end 10 includes a cylindrical portion 11 that surrounds the wires 50 and is open in the longitudinal direction of the cable guide 51, and the rotary portion 12 that is provided on an upper surface of the cylindrical portion 11 in a protruding manner and has an outer surface formed with a curved surface.

The cylindrical portion 11 has a rectangular shape in cross section, and includes an upper wall 13 disposed on the upper side, a lower wall 14 disposed on the lower side, and a pair of side walls 15 standing between the upper wall 13 and the lower wall 14. The pair of side walls 15 stand substantially vertically relative to the upper wall 13 and the lower wall 14. The cylindrical portion 11 also has the end wall 18 erected at an end thereof in the longitudinal direction of the cable guide 51. The end wall 18 is curved in an arc shape (semicircular shape) in a plan view, and stands substantially vertically relative to the lower wall 14.

One end portion of the cylindrical portion 11 in the longitudinal direction of the cable guide 51 is provided with a connecting portion 16 to be connected to another link 52. The connecting portion 16 is formed with connecting holes 17 penetrating vertically through the upper wall 13 and the lower wall 14, respectively.

As shown in FIG. 7, the rotary portion 12 has a spherical shape as a whole, and protrudes at the upper surface of an end portion of the cylindrical portion 11 on the opposite side to the connecting portion 16.

The rotary portion 12 is provided with the upper flange 19 protruding substantially in a horizonal direction. The upper flange 19 is protrudingly provided in the vertically central portion of the rotary portion 12 (a portion having the largest horizontal diameter), and is configured to be able to enter the groove 43 in the bracket 40. The upper flange 19 is continuous over the entire circumference of the rotary portion 12 with a constant protrusion dimension. Both upper and lower surfaces of the upper flange 19 are substantially horizontal surfaces.

The outer surface of the rotary portion 12A is formed with a spherical surface constituted of a surface of a single sphere. A portion of the spherical surface above the upper flange 19 is an upper spherical surface 21 in which the horizontal diameter gradually decreases upward, and a portion below the upper flange 19 is a lower spherical surface 22 in which the horizontal diameter gradually decreases downward. The upper spherical surface 21 and the lower spherical surface 22 are continuous over the entire circumference of the rotary portion 12. The upper spherical surface 21 and the lower spherical surface 22 have a vertically symmetrical shape with respect to the upper flange 19. The upper spherical surface 21 and the lower spherical surface 22 are disposed along the curved surface 42 of the bracket 40. The upper spherical surface 21 and the lower spherical surface 22 are relatively displaced along the curved surface 42, whereby the guide end 10 can assume a tilting posture.

A wire insertion hole 23 is formed inside the rotary portion 12, for drawing out the wires 50 inserted through the cable guide 51 to the outside.

As shown in FIG. 4, the guide end 10 includes a lower flange 24 that can be disposed in proximity to or in abutment against a lower surface of the bracket 40 (a lower end surface of the hanging portion 47). As shown in FIG. 7, the lower flange 24 is provided at the lower end of the cylindrical portion 11, and is substantially parallel to the upper flange 19. The lower flange 24 is provided on the opposite side to the connecting portion 16, and protrudes to the outside of the end wall 18 along the lower surface of the cylindrical portion 11. The lower flange 24 has an annular shape in a plan view continuous all over the area where the end wall 18 is formed. The lower flange 24 has a slightly larger thickness (vertical dimension) than the upper flange 19.

Figure 9:
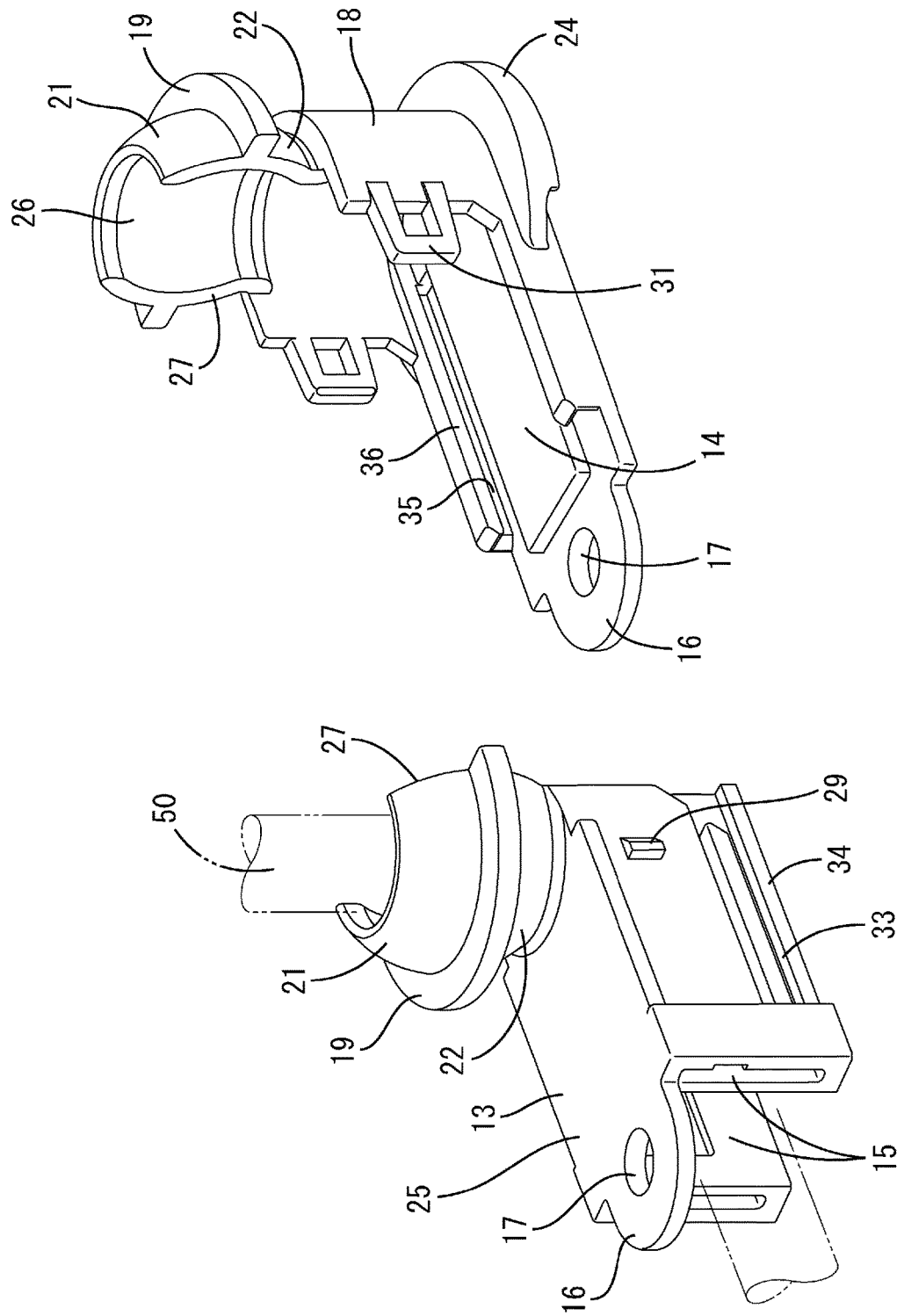
FIG. 9 is a perspective view showing a first segment and a second segment before being combined.

As shown FIG. 9, the guide end 10 has a first segment 25 and a second segment 26 with the wire insertion hole 23 divided circumferentially. In a state where the first segment 25 and the second segment 26 are combined, the entire circumference of the wire insertion hole 23 is closed. In a state where the first segment 25 and the second segment 26 are not combined, the wire insertion hole 23 is in an open state. The first segment 25 and the second segment 26 are combined in a horizontal direction.

The rotary portion 12 is divided into two in the longitudinal direction of the cable guide 51, and the wire insertion hole 23 opens in the longitudinal direction of the cable guide 51. The division surfaces 27 of the rotary portion 12 are substantially vertical.

The guide end 10 has a locking structure 28 that locks the combined first segment 25 and second segment 26 so as to be inseparable. The locking structure 28 has locking protrusions 29 and locking pieces 31 engageable with each other in the longitudinal direction of the cable guide 51 (horizontal direction).

The first segment 25 and the second segment 26 have a fitting structure 32 that is capable of being horizontally slid and vertically engaged. The fitting structure 32 is provided on both side surfaces of the guide end 10 and configured to fit in a concavo-convex manner, and has a shape elongated in the sliding direction.

Figure 8:
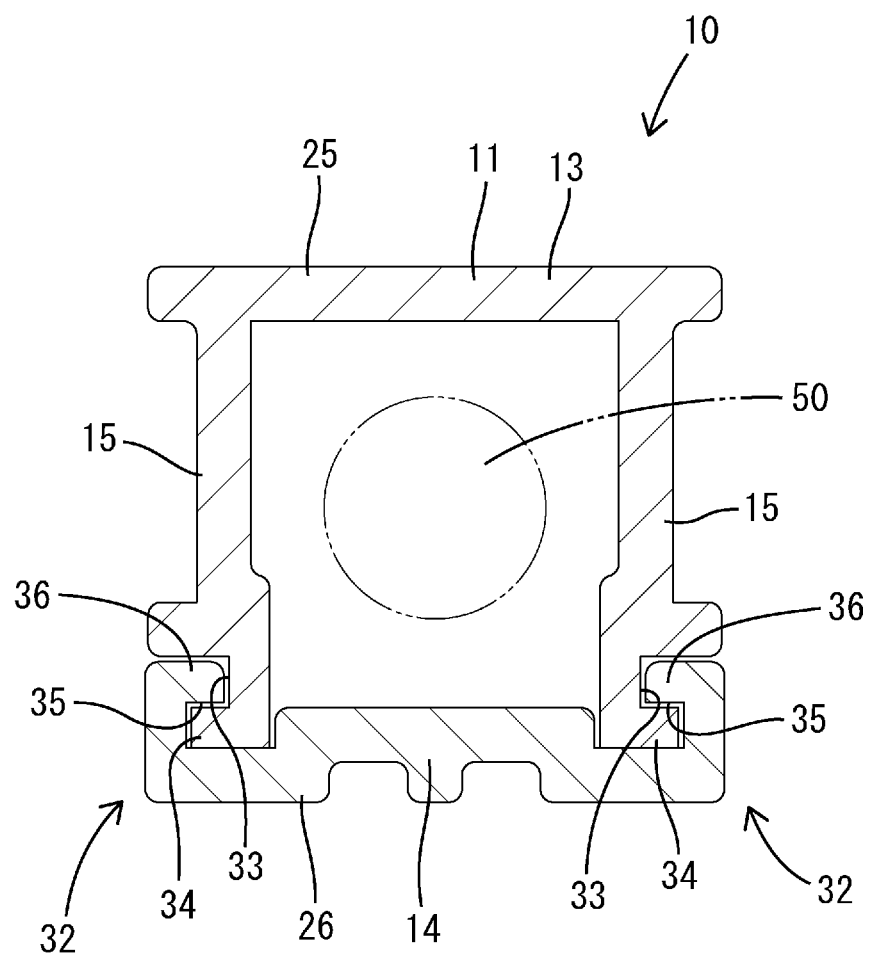
FIG. 8 is a cross-sectional view of the guide end of the cable guide, corresponding to a cross section taken at position B-B in FIG. 7.

As shown in FIG. 8, the fitting structure 32 includes first grooves 33 and first protruding portions 34 provided in the first segment 25, and second grooves 35 and second protruding portions 36 provided in the second segment 26. The first protruding portions 34 are fitted into the second grooves 35, and the second protruding portions 36 are fitted into the first grooves 33.

Next, an example of an assembling operation of the wire harness W and a mounting operation of the wire harness W onto a vehicle in the present embodiment will be described.

First, a connector (not shown) is connected to an end portion of the wires 50. Terminal fittings are crimped onto terminal portions of the wires 50, and the terminal fittings are inserted into the connector.

Next, the guide end 10 is attached to the cable guide 51. The bundle of the wires 50 drawn out from the links 52 of the cable guide 51 is made in conformance with the first segment 25 as shown in FIG. 9, and the second segment 26 is slid and combined with the first segment 25. At this time, the connector is put out above the rotary portion 12. By the fitting structure 32, sliding movement (combining movement) between the first segment 25 and the second segment 26 is smoothly guided, and eventually the division surfaces 27 of the rotary portion 12 are brought into close contact with each other, with the result that the bundle of the wires 50 becomes in a state of extending through the wire insertion hole 23. In addition, the locking pieces 31 climb over the locking protrusions 29 and elastically return, so that the locking pieces 31 and the locking protrusions 29 are engaged with each other. The guide end 10 in which the first segment 25 and the second segment 26 are thus combined is connected to the links 52, whereby the assembly of the cable guide 51 is completed.

Next, the guide end 10 is held by the bracket 40. With the holding portion 41 of the bracket 40 in the open state, the upper flange 19 of the guide end 10 is put into the groove 43 of one of the half bodies 45 of the bracket 40, and the other half body 45 is closed. The upper flange 19 then becomes in a state of entering the groove 43 over the entire circumference. As a result, the rotary portion 12 is held by the holding portion 41 in a state of being prevented from coming out downward, and the guide end 10 is fixed in a hanging state. The upper spherical surface 21 and the lower spherical surface 22 of the rotary portion 12 becomes in proximity to the curved surface 42 of the holding portion 41. As a result, the guide end 10 can assume a tilting posture due to a clearance in the groove 43 while the upper spherical surface 21 and the lower spherical surface 22 are slid on the curved surface 42.

Thus, the assembling operation of the wire harness W and the mounting operation of the wire harness W onto the vehicle are completed.

Next, the functions and effects of the embodiment configured as above will be described.

The wire harness W in the present embodiment includes the bracket 40 to be fixed to the sliding door D, and the guide end 10 disposed at the end portion of the cable guide 51 that can be bent into a predetermined shape, and held by the bracket 40. The rotary portion 12 having the outer surface formed with the spherical surfaces 21 and 22 is provided on the upper surface side of the guide end 10. The rotary portion 12 is provided with the upper flange 19 that protrudes substantially in a horizontal direction and enters the groove 43 formed in the bracket 40. According to this configuration, since the guide end 10 is suspended from and held by the bracket 40 in a rotatable state, it is not necessary to provide in the bracket a portion for supporting the lower surface side of the guide end 10, with the result that the mounting position of the wire harness W can be lowered.

Furthermore, the rotary portion 12 has the upper spherical surface 21 and the lower spherical surface 22 on both upper and lower sides of the upper flange 19, and the bracket 40 has the curved surface 42 in conformance with the spherical surfaces 21 and 22. According to this configuration, the guide end 10 can assume a tilting posture while the spherical surfaces 21 and 22 are slid on the curved surface 42, with the result that a clearance between the rotary portion 12 and the bracket 40 can be reduced. Accordingly, backlash of the guide end 10 relative to the holding portion 41 is suppressed, so that occurrence of large abnormal noise can be prevented.

The guide end 10 includes the lower flange 24 that abut against on the lower surface of the bracket 40. According to this configuration, the bracket 40 is sandwiched between the upper flange 19 and the lower flange 24, with the result that the guide end 10 can be prevented from being inclined excessively and hindered in its rotational movement.

Other Embodiments

The present invention is not limited to the embodiment described by the above description and the drawings. For example, the following embodiments are included in the technical scope of the present invention.

(1) Although the above embodiment has described a case where the present invention is applied to the guide end 10 on the sliding door D side, the present invention may be applied to a body-side guide end.

(2) Although the above embodiment has described a case where the present invention is applied to the wire harness W for a sliding door, the present invention may be applied to various wire harnesses with a cable guide that can be bent into a predetermined shape (such as a wire harness to be connected to a sliding seat).

(3) In the above embodiment, the spherical surfaces 21 and 22 are formed on both upper and lowersides of the upper flange 19, but the present invention is not limited to this, Only a lower spherical surface may be provided, for example.

(4) In the above embodiment, the outer surface of the rotary portion 12 is constituted as the spherical surfaces 21 and 22, but the present invention is not limited to this. The outer surface of the rotary portion may be a curved surface constituted of a peripheral surface of a cylindrical member.

(5) In the above embodiment, the guide end 10 includes the lower flange 24, but may not necessarily include a lower flange.

(6) In the above embodiment, the guide end 10 has the first segment 25 and the second segment 26 with the wire insertion hole 23 divided circumferentially, but the present invention is not limited to this. The guide end may be divided into the upper side (rotary portion side) and the lower side (lower wall side), for example.

(7) In the above embodiment, the upper spherical surface 21 and the lower spherical surface 22 have a vertically symmetrical shape with respect to the upper flange 19, but the present invention is not limited to this. One spherical surface may be made smaller than the other spherical surface, for example.

REFERENCE SIGNS LIST

D sliding door (fixed portion)
W wire harness
10 guide end
12 rotary portion
19 upper flange
21 upper spherical surface (curved surface)
22 lower spherical surface (curved surface)
24 lower flange
40 bracket
42 curved surface
43 groove
50 wire
51 cable guide

The invention claimed is:

1. A cable guide device comprising:
a bracket to be fixed to a fixed portion;
a guide end disposed at an end portion of a cable guide that can be bent into a predetermined shape, and held by the bracket;
a rotary portion provided on an upper surface side of the guide end in a state of being held by the bracket fixed to the fixed portion, and having an outer surface formed with a curved surface; and
an upper flange protruding from the outer surface of the rotary portion substantially in a horizontal direction in the state of being held by the bracket, and configured to enter a groove formed in the bracket, wherein
the rotating portion has spherical surfaces on both upper and lower sides of the upper flange in the state of being held by the bracket,
the bracket has a curved surface in conformance with the spherical surfaces,
the spherical surfaces of the rotating portion are configured to slide on the curved surface of the bracket,
a wire insertion hole is formed inside the rotary portion, and
the rotary portion is divided so as to open the wire insertion hole.

2. A wire harness comprising:
the cable guide device according to claim 1, and
a plurality of wires inserted through the cable guide.

3. A cable guide device comprising:
a bracket to be fixed to a fixed portion;
a guide end disposed at an end portion of a cable guide that can be bent into a predetermined shape, and held by the bracket;
a rotary portion provided on an upper surface side of the guide end in a state of being held by the bracket fixed to the fixed portion, and having an outer surface formed with a curved surface; and
an upper flange protruding from the outer surface of the rotary portion substantially in a horizontal direction in the state of being held by the bracket, and configured to enter a groove formed in the bracket, wherein
the rotating portion has spherical surfaces on both upper and lower sides of the upper flange in the state of being held by the bracket,
the bracket has a curved surface in conformance with the spherical surfaces and a hanging portion hanging downward from the curved surface substantially vertically and facing a side wall or an end wall of the guide end, and
the guide end includes a lower flange that can abut against a lower end of the hanging portion in the state of being held by the bracket, the lower flange being provided at a lower end of the guide end,
a wire insertion hole is formed inside the rotary portion, and
the rotary portion is divided so as to open the wire insertion hole.

4. A wire harness comprising:
the cable guide device according to claim 3, and
a plurality of wires inserted through the cable guide.

* * * * *